US009287677B2

(12) United States Patent  
Clowes et al.

(10) Patent No.: US 9,287,677 B2  
(45) Date of Patent: Mar. 15, 2016

(54) HYBRID OPTICAL PULSE SOURCE

(71) Applicant: Fianium Ltd., Southampton (GB)

(72) Inventors: John Redvers Clowes, New Milton (GB); Anatoly Borisovich Grudinin, Southampton (GB); Ian Michael Godfrey, Almonte (CA); Kestutis Vysniauskas, Basingstoke (GB)

(73) Assignee: Fianium Ltd., Southampton (GB)

( * ) Notice: Subject to any disclaimer, the term of this patent is extended or adjusted under 35 U.S.C. 154(b) by 0 days.

(21) Appl. No.: 14/556,746

(22) Filed: Dec. 1, 2014

(65) Prior Publication Data

US 2015/0131144 A1     May 14, 2015

Related U.S. Application Data

(63) Continuation of application No. 13/797,640, filed on Mar. 12, 2013, now Pat. No. 8,902,496, which is a continuation of application No. 13/523,723, filed on Jun. 14, 2012, now Pat. No. 8,593,726, which is a continuation of application No. 12/087,850, filed as application No. PCT/GB2007/000136 on Jan. 18, 2007, now Pat. No. 8,379,298.

(30) Foreign Application Priority Data

Jan. 20, 2006 (GB) .................................. 0601154.8

(51) Int. Cl.
*H01S 3/11* (2006.01)
*H01S 3/109* (2006.01)
(Continued)

(52) U.S. Cl.
CPC . *H01S 3/11* (2013.01); *H01S 3/005* (2013.01); *H01S 3/0092* (2013.01);
(Continued)

(58) Field of Classification Search
CPC .................................................... H01S 3/2308
See application file for complete search history.

(56) References Cited

U.S. PATENT DOCUMENTS 5,323,404 A * 6/1994 Grubb .................. H01S 3/0675  
                                                                   359/334  
5,440,576 A * 8/1995 Welch .................. H01S 5/4031  
                                                                   359/349

(Continued)

FOREIGN PATENT DOCUMENTS

EP     1720223 A1     7/2005  
EP     1564853 A2     8/2005

(Continued)

OTHER PUBLICATIONS

Office Action dated Sep. 25, 2013 in U.S. Appl. No. 12/316,006.

(Continued)

*Primary Examiner* — Ari M Diacou  
(74) *Attorney, Agent, or Firm* — Peter Rainville

(57) ABSTRACT

The invention can include an optical pulse source for providing optical output pulses, comprising a master oscillator comprising a mode locked fiber oscillator producing optical pulses having an optical pulse frequency; at least one optical fiber amplifier optically coupled to the master oscillator, the at least one optical amplifier including a final optical fiber amplifier; a bulk optic amplifier element optically coupled to the output of the final optical fiber amplifier; a nonlinear optical fiber for nonlinearly producing light, the nonlinear optical fiber optically coupled to the output of the bulk optic amplifier element; an optical pulse compressor optically coupled to the output of the nonlinear optical fiber; and a pulse picker operable to reduce the optical pulse frequency of the optical output pulses to be less than the optical pulse frequency of the optical pulses produced by the master oscillator.

14 Claims, 6 Drawing Sheets

(51) Int. Cl.
*H01S 3/23* (2006.01)
*H01S 3/00* (2006.01)
*H01S 3/067* (2006.01)
*H01S 3/16* (2006.01)

(52) U.S. Cl.
CPC ............ *H01S 3/06758* (2013.01); *H01S 3/109* (2013.01); *H01S 3/2308* (2013.01); *H01S 3/0057* (2013.01); *H01S 3/067* (2013.01); *H01S 3/06712* (2013.01); *H01S 3/1618* (2013.01)

(56) References Cited

U.S. PATENT DOCUMENTS

| | | | |
|---|---|---|---|
| 5,768,461 A * | 6/1998 | Svetkoff | G02B 6/065 385/116 |
| 5,847,863 A | 12/1998 | Galvanauskas et al. | |
| 5,867,305 A * | 2/1999 | Waarts | H01S 3/06754 359/337.12 |
| 5,880,877 A | 3/1999 | Fermann et al. | |
| 5,923,683 A | 7/1999 | Morioka et al. | |
| 6,049,415 A * | 4/2000 | Grubb | H01S 3/06758 359/341.1 |
| 6,081,369 A * | 6/2000 | Waarts | H01S 3/06754 359/341.33 |
| 6,099,541 A * | 8/2000 | Klopotek | A61F 9/013 606/166 |
| 6,181,463 B1 | 1/2001 | Galvanauskas et al. | |
| 6,275,250 B1 | 8/2001 | Sanders et al. | |
| 6,307,667 B1 | 10/2001 | Liang | |
| 6,373,623 B1 | 4/2002 | Ohshima et al. | |
| 6,611,643 B2 | 8/2003 | Birk et al. | |
| 6,687,000 B1 | 2/2004 | White | |
| 6,690,463 B2 | 2/2004 | Kask | |
| 6,781,750 B2 | 8/2004 | Feillens et al. | |
| 6,885,683 B1 | 4/2005 | Fermann et al. | |
| 7,041,951 B2 | 5/2006 | Hoppe et al. | |
| 7,046,432 B2 * | 5/2006 | Starodoumov | H01S 3/094003 359/341.32 |
| 7,088,491 B2 | 8/2006 | Takita et al. | |
| 7,218,443 B2 | 5/2007 | Tauser et al. | |
| 7,224,518 B2 | 5/2007 | Tauser et al. | |
| 7,394,591 B2 | 7/2008 | Harter | |
| 7,469,081 B2 * | 12/2008 | Byer | G02B 6/4296 356/301 |
| 2002/0133145 A1 * | 9/2002 | Gerlach | A61B 3/135 606/4 |
| 2002/0164135 A1 * | 11/2002 | Tadakuma | G02B 6/29377 385/122 |
| 2003/0086154 A1 * | 5/2003 | Feillens | H01S 3/06754 359/341.3 |
| 2003/0156605 A1 | 8/2003 | Richardson et al. | |
| 2003/0231663 A1 * | 12/2003 | Ohtsuki | G02B 6/14 372/22 |
| 2004/0004780 A1 * | 1/2004 | Watanabe | G02F 1/3515 359/891 |
| 2004/0065845 A1 | 4/2004 | Seyfried | |
| 2004/0086005 A1 | 5/2004 | Kitaoka et al. | |
| 2004/0092828 A1 * | 5/2004 | Hoppe | G02B 21/241 600/476 |
| 2004/0134894 A1 * | 7/2004 | Gu | B23K 26/04 219/121.68 |
| 2004/0190119 A1 * | 9/2004 | Tauser | H01S 3/0057 359/333 |
| 2004/0207905 A1 * | 10/2004 | Tauser | G02F 1/383 359/333 |
| 2004/0213302 A1 | 10/2004 | Fermann et al. | |
| 2004/0263950 A1 * | 12/2004 | Fermann | H01S 3/0057 359/333 |
| 2005/0041702 A1 * | 2/2005 | Fermann | B23K 26/063 372/25 |
| 2005/0105865 A1 * | 5/2005 | Fermann | H01S 3/0057 385/122 |
| 2005/0238070 A1 * | 10/2005 | Imeshev | G02F 1/3558 372/21 |
| 2005/0265407 A1 * | 12/2005 | Braun | H01S 3/06754 372/30 |
| 2006/0120418 A1 * | 6/2006 | Harter | H01S 3/0092 372/30 |
| 2006/0263024 A1 * | 11/2006 | Dong | G02B 6/024 385/125 |
| 2007/0025662 A1 | 2/2007 | Gugel | |
| 2007/0119829 A1 * | 5/2007 | Vietz | B23K 26/04 219/121.63 |
| 2007/0248136 A1 * | 10/2007 | Leonardo | B23K 26/067 372/55 |
| 2008/0013163 A1 * | 1/2008 | Leonardo | G02F 1/353 359/341.31 |
| 2008/0068702 A1 * | 3/2008 | Liu | H01S 3/0057 359/341.1 |
| 2008/0106786 A1 * | 5/2008 | Nagasawa | A61B 5/0059 359/379 |
| 2009/0046352 A1 * | 2/2009 | Brunet | H01S 3/06754 359/333 |
| 2009/0097512 A1 | 4/2009 | Clowes et al. | |
| 2009/0213879 A1 * | 8/2009 | Stadler | H01S 3/2316 372/20 |
| 2009/0273828 A1 * | 11/2009 | Waarts | H01S 3/0057 359/341.1 |
| 2010/0046066 A1 | 2/2010 | Fermann et al. | |
| 2010/0135338 A1 * | 6/2010 | Herda | G02F 1/383 372/5 |
| 2010/0296529 A1 * | 11/2010 | Andersen | H01S 3/067 372/6 |
| 2011/0002691 A1 * | 1/2011 | Lin | H01S 3/10023 398/118 |
| 2011/0069376 A1 * | 3/2011 | Diening | H01S 3/042 359/329 |
| 2012/0217375 A1 * | 8/2012 | Lin | H01S 3/0057 250/208.1 |
| 2014/0168755 A1 * | 6/2014 | Clowes | H01S 3/0057 359/341.1 |
| 2014/0293404 A1 * | 10/2014 | Pierrot | H01S 3/094076 359/341.3 |
| 2014/0300951 A1 * | 10/2014 | Messerly | H01S 3/06758 359/334 |

FOREIGN PATENT DOCUMENTS

| | | |
|---|---|---|
| JP | 2005-347338 A | 12/2005 |
| WO | WO2005022705 A2 | 3/2005 |
| WO | WO2005081430 A2 | 9/2005 |

OTHER PUBLICATIONS

Amendment and Response to Office Action dated Sep. 25, 2013 in U.S. Appl. No. 12/316,006.
Communication—Intent to grant a European patent for EP 08169413, Jan. 8, 2014 (10 pages).
Claims in Main Request in EP 08169413, Jan. 8, 2014 ( 5 pages).
Specification, Claims & Drawings in EP 08169413, Jan. 8, 2014 ( 36 pages).
Communication by telephone/ in person in EP 08169413, Dec. 20, 2013 (4 pages).
Non-Final Office Action issued Apr. 27, 2010 in U.S. Appl. No. 12/316,006.
Response/Amendment filed Oct. 27, 2010 in U.S. Appl. No. 12/316,006.
Final Office Action issued Jan. 20, 2011 in U.S. Appl. No. 12/316,006.
Examiner Interview Summary Record dated Jul. 11, 2011—U.S. Appl. No. 12/316,006.
Response/Amendment After Final Office Action filed Aug. 3, 2011 with USPTO in U.S. Appl. No. 12/316,006.
Advisory Action issued Oct. 4, 2011 in U.S. Appl. No. 12/316,006.
Request for Continued Examination of U.S. Appl. No. 12/316,006, filed Dec. 20, 2011.
Applicant Initiated Interview Summary Record dated Jan. 19, 2012—U.S. Appl. No. 12/316,006.
Non-Final Office Action issued Mar. 2, 2012 in U.S. Appl. No. 12/316,006.

(56) References Cited

OTHER PUBLICATIONS

Response/Amendment filed Aug. 14, 2012 in U.S. Appl. No. 12/316,006.
Final Office Action issued Nov. 15, 2012 in U.S. Appl. No. 12/316,006.
European Search Report from European Application No. 08 169 413.5, mailed Feb. 23, 2009.
Hegner, Anette, Letter and Observations, Feb. 16, 2011.
Communication pursuant to Article 94(3) EPC, European Patent Office, May 2, 2011 Application No. 08169413.5-2205.
Part I—Hegner,Observations pursuant to Article 115 EPC filed in EP Application No. 08169413.5 (EP2081074) Nov. 1, 2011 (11 of 26 total pages).
Response to Communication pursuant to Art. 94(3) EPC in EP Application No. 08169413.5 (EP2081074) Sep. 12, 2011 (13 pages).
Claims accompanying Response to Communication pursuant to Art. 94(3) EPC in EP Application No. 08169413.5 (EP2081074) Sep. 12, 2011 (6 pages).
Specification Amendments accompanying Response to Communication pursuant to Art. 94(3) EPC in EP Application No. 08169413.5 (EP2081074) Sep. 12, 2011 (5 pages).
Part II—Hegner,Observations pursuant to Article 115 EPC filed in EP Application No. 08169413.5 (EP2081074) Nov. 1, 2011 (15 of 26 total pages).
Response of Jan. 17, 2012 to Hegner,Observations pursuant to Article 115 EPC filed in EP Application No. 08169413.5 (EP2081074) Nov. 1, 2011 (11 pages).
Amended claims accompanying Response of Jan. 17, 2012 to Hegner,Observations pursuant to Article 115 EPC filed in EP Application No. 08169413.5 (EP2081074) Nov. 1, 2011 (6 pages).
Communication Pursuant to Article 94(3) EPC in EP Application No. 08169413.5 (EP2081074) Feb. 16, 2012 (5 pages).
Response to Communication Pursuant to Article 94(3) EPC in EP Application No. 08169413.5 (EP2081074) Jun. 26, 2012 (11 pages).
Claims Accompanying Response to Communication Pursuant to Article 94(3) EPC in EP Application No. 08169413.5 (EP2081074) Jun. 26, 2012 (6 pages).
EPO Form 2906—Annex to Summons to Oral Proceedings—in EP Application No. 08169413.5 (EP2081074) Aug. 24, 2012 (7 pages).
Observations and Prior Art with relevance to European patent application EP 08169413.5, Aug. 24, 2012 (14 pgs).
Stanford Research Systems, Data sheet, "Digital Delay/Pulse Generator DG535" (4 pgs).
Stanford Research Systems, Product Manual "Model DG535 Digital Delay/Pulse Generator", Sunnyvale, CA, Revision 2.9, Feb. 2006 (54 pgs).
Agilent Technologies, Web Print-out, "8131A High-Speed Pulse Generator, 500 MHz", 2000-2012 (1 pg).
Letter accompanying subsequently filed items, Application No. 08169413.5, Hegner & Partners A/S, Sep. 4, 2012 (1 pg).
Communication from EPO, Oct. 11, 2013.
Auxiliary Requests, Oct. 25, 2012.
Response to Summons to attend Oral Proceedings and Main Request, Oct. 25, 2012.
EPO Findings Regarding Oral Proceedings, Nov. 12, 2012.
Written Submission for Oral Proceedings, Nov. 21, 2012.
Auxiliary Requests, Nov. 21, 2012.
Communication Regarding Oral Proceedings, Nov. 23, 2012.
Minutes of Oral Proceedings, Jan. 8, 2013.
Intention to Grant—Rule 71(3) EP, Jan. 11, 2013.
Alfano, R. R., et al., "Observation of Self-Phase Modulation and Small-Scale Filaments in Crystals and Glasses", Physical Review Letters, vol. 24, No. 11, Mar. 1970, pp. 592-594.
Donnert, G., et al., "Macromolecular-scale Resolution in Biological Fluorescence Microscopy", PNAS, vol. 103, No. 31, Aug. 2006, pp. 11440-11445.
Norris, T. B., "Femtosecond pulse amplification at 250 kHz with a Ti:sapphire regenerative amplifier and application to continuum generation", Optics Letters, vol. 17, No. 14, Jul. 1992, pp. 1009-1011.
Ranka, J. K., et al., "Efficient visible continuum generation in air-silica microstructure optical fibers with anomalous dispersion at 800 nm", CLEO '09, Conference in Baltimore, MD, May 1999.
Ranka, J. K., et al., "Visible continuum generation in air-silica microstructure optical fibers with anomalous dispersion at 800 nm", Optics Letters, vol. 25, No. 1, Jan. 2000, pp. 25-27.
Rusu, M., et al., "Slicing the supercontinuum radiation generated in photonic crystal fiber using an all-fiber chirped-pulse amplification system", Optics Express, vol. 13, No. 17, Aug. 2005.
Wadsworth, W. J., et al., "Supercontinuum and four-wave mixing with Q-switched pulses in endlessly single-mode photonic crystal fibers", Optics Express, vol. 12, No. 2, Jan. 2004.
Borlinghaus, Rolf, "Closing the spectral gap—the transition from fixed-parameter fluorescence to tunable devices in confocal microscopy", SPIE, vol. 6090 (2006).
Price, J.H.V., "Soliton transmission and supercontinuum generation in holey fiber, using a diode pumped Ytterbium fiber source", Optics Express, vol. 10, No. 8, Apr. 22, 2002.
Elson, et al., "Fluorescence lifetime system for microscopy and multiwell plate imaging with a blue picosecond diode laser", Optics Letters, vol. 27 No. 16, Aug. 15, 2002.
T.V. Andersen et al.. "High repetition rate tunable femtosecond pulses and broadband amplification from fiber laser pumped parametric amplifier", Optics Express, vol. 14, No. 11, p. 4765-4773, May 2006.
Dunsby, C., et al., "An electronically tunable ultrafast laser source applied to fluorescence imaging and fluorescence lifetime imaging microscopy", Journal of Physics D: Applied Physics, vol. 37, pp. 3296-3303, Nov. 19, 2004.
Jonathan Hugh Vaughan Price, "The Development of High Power, Pulsed Fiber Laser Systems and their Applications," University of Southampton, Optoelectronics Research Centre, Doctor of Philosophy Thesis, Jul. 2003 (181 pgs).
Third Party Observations in EP Application No. 08 169 413.5, Hegner, dated Jan. 22, 2013.
"STED Microscopy With a Supercontinuum Laser Source", Wildanger et al., Optics Express, vol. 16, No. 13, pp. 9614-9621, Jun. 23, 2008.
"Time Correlated single Photon Counting Fluorescence Lifetime Confocal Imaging of Decayed and Sound Dental Structures With a White-Light Supercontinuum Source", McConnel et al., Journal of Microscopy, vol. 225, Pt 2 Feb. 2007, pp. 126-136.
"Dispersion Measurement in Optical Fibers Using Suoercontinuum Pulses", Hult et al., Journal of Lightwave Technology, vol. 25, No. 3, pp. 820-824, Mar. 2007.
Fianium FemtoPower Product Data Sheet.
Communication from Examining Division in EP Application No. 08 169 413.5, Feb. 2013.
Communication from the EPO examination division: Communication Pursuant to Article 94(3) EPC 07 700 401.8-2217, (EP1979997) dated Nov. 14, 2012 (5 pages).
Reply, dated Aug. 13, 2012, to EPO Communication Pursuant to Article 94(3) EPC 07 700 401.8-2216, (EPI979997) dated Feb. 22, 2012, including claims and substitute drawings (17 pages).
Limpert J et al, "High-power femtosecond fiber laser systems" Proceedings of the SPIE, SPIE, Bellingham, VA US, vol. 4978, No. 1, 2003, pp. 6-20, XP002361181, ISSN: 0277-786X.
Communication from the EPO examination division: Communication Pursuant to Article 94(3) EPC 07 700 401.8-2217, (EP1979997) dated Feb. 22, 2012 (6 pages).
Communication from the EPO examination division: Communication Pursuant to Article 94(3) EPC 07 700 401.8-2216, (EP1979997) dated Aug. 6, 2010 (4 pages).
Reply, dated Dec. 30, 2010, to EPO Communication Pursuant to Article 94(3) EPC 07 700 401.8-2216, (EPI979997) dated Aug. 6, 2010 (10 pages).

\* cited by examiner

HYBRID OPTICAL PULSE SOURCE

CROSS REFERENCE TO RELATED APPLICATIONS

This application claims the benefit of priority under 35 U.S.C. §120 as a continuation application of U.S. Ser. No. 13/797,640, filed Mar. 12, 2013. U.S. Ser. No. 13/797,640 further claims priority under 35 U.S.C. §120 to U.S. Ser. No. 13/523,723, filed 14 Jun. 2012, which application in turn claims the benefit of priority under 35 U.S.C. §120 as a continuation application of U.S. Ser. No. 12/087,850, bearing a 371 date of 16 Jan. 2009, which application in turn claims the benefit of priority under 35 U.S.C. §365 of International Patent Application Serial No. PCT/GB2007/000136, filed on Jan. 18, 2007, designating the United States of America, which in turn claims the benefit of priority under 35 U.S.C. §119 of United Kingdom Patent Application Serial No. GB 0601154.8, filed on Jan. 20, 2006. All of the foregoing applications are hereby incorporated by reference.

FIELD OF THE INVENTION

The invention relates to a high power short optical pulse source.

BACKGROUND

There are many existing and emerging applications of high power lasers in industrial, medical and scientific processes. Conventionally, solid state and gas lasers, with bulk-optical cavities, are used in these applications, and the outputs of these lasers are generally free space, collimated beams. In most cases, the laser source can be very large, and often constitutes the largest single element of an instrument or machine. In using laser systems in industrial applications, it is often difficult to position the large laser very close to the intended target of the laser beam and therefore bulk-optic beam steering is required. Such beam steering includes specially designed, low loss, high reflective and high-damage threshold minors, mounted and positioned with precision and on a heavy and vibration-isolated surface to enable a robust, reliable performance. In many applications such as semiconductor inspection, the inspection tool is just one of many instruments and machines used within the semiconductor manufacturing process, and space on the manufacturing floor—very often being in an expensive, clean-room environment—costs a premium. Therefore, reduction of the instrumentation footprint is highly beneficial. In other industrial applications, such as laser materials processing, the application environment can very often be noisy, dirty and a challenge to the operation of a laser source. In this application additional measures are often required to protect the laser and beam steering optics from the hostile working environment.

Fiber delivery of the laser beam is a clear and interesting option, enabling the laser source to be positioned remotely from the target space and enabling a compact optical beam delivery head (optical head) to be installed within the instrument, with the large laser source being positioned, along with any power supplies and cooling systems, outside an instrument and clean room environment. With conventional bulk lasers, fiber delivery involves launching of the laser output beam into an optical fiber. This is very difficult to achieve, especially in high-power laser applications. Most applications require a good beam quality of the laser, which requires a single mode fiber to deliver the beam. In reality, a single mode fiber has a core diameter of less than 15 µm, very often less than 10 µm, and efficient and stable launching of a beam into this aperture is difficult to achieve. Furthermore, in high-power applications, launching of such high intensities into a fiber will damage the fiber facet.

In addition, applications of UV fiber lasers cannot use a conventional optical fiber to deliver the beam since the UV is absorbed by the fiber. One option that has been considered is to use Hollow Core Photonic Crystal Fibers (HCPCF's) in which the light is mostly guided within an air-core of the fiber. The use of HCPCF's does not solve the problem of launching the light into the fiber and avoiding facet damage at high powers. However, HCPCF's have two benefits—they enable the propagation of UV radiation with relatively low loss and also reduced fiber nonlinearity by a factor of approximately 1000 in comparison to conventional glass-guided optical fibers.

Fiber lasers clearly have a significant advantage over conventional bulk lasers, since the optical beam is already within the fiber and no launching optics are required. Most high-power fiber lasers, particularly in the pulsed lasers, use a Master Oscillator Power Amplifier (MOPA) configuration, in which the output of a low-power fiber oscillator is amplified in a series of high-power fiber amplifiers. In principle, the output of a fiber laser or fiber amplifier can be delivered directly to the intended target through an output fiber. However, in short pulse applications the nonlinear effects of the fiber and amplifier prevent this. Short optical pulses are generally defined (and defined herein) as pulses having a duration of less than 10 ns ($10^{-8}$ seconds). Reduction of fiber nonlinearity is a major challenge in any fiber-based system, particularly when short pulses are required at relatively high peak intensities.

In cw and long pulse applications, there is little issue with the use of additional lengths of fiber at the amplifier output, since nonlinear effects can often be neglected owing to relatively low peak powers. However, for short-pulse fiber delivery, the nonlinear effects within an optical fiber prevent the delivery of high power pulses due to degradation of the pulses' temporal and spectral characteristics due to high order nonlinear effects such as self-phase modulation, which causes spectral broadening, and Raman scattering, which causes both spectral and temporal broadening.

HCPCF's and conventional optical fibers with larger core sizes (referred to as large-mode-area (LMA) fibers) have been used to reduce fiber nonlinearity. HCPCF's reduce the nonlinearity by several orders of magnitude, where LMA fibers reduce the nonlinearity, scaling with the area of the core. However, the use of LMA fibers for beam delivery in high-power pulsed applications is not a solution since even the largest single-mode core fiber (of 15-20 µm), results in significant nonlinear effects when high-peak power pulses are delivered.

The importance of reducing nonlinear effects can be illustrated by considering UV to generation from a short-pulse source. The use of short pulses to generate visible and UV radiation is a common approach, since the high peak powers attainable from short pulses provide efficient frequency conversion in nonlinear materials such as lithium triborate (LBO) and β-barium borate (BBO). However, efficient conversion within conventional nonlinear media often requires that the spectral bandwidth of the pulse is as narrow as possible—preferably with the pulses transform limited. Any high order nonlinearity within a delivery fiber or a fiber amplifier will result in spectral broadening; a relatively low nonlinearity will double the spectral bandwidth of a pulse and hence significantly reduce the conversion efficiency of that pulse. It is therefore important in all stages of amplification of the pulse to avoid or reduce fiber nonlinear effects.

For amplifying short optical pulses, it is possible to use Chirped Pulse Amplification (CPA), a technique developed for bulk-laser systems, in which a short pulse from an oscillator is stretched in a fiber or bulk optic stretcher, amplified and then compressed. In this instance, the amplified, long pulses can also be delivered by an optical fiber to a remote probe where they are subsequently re-compressed, as described in U.S. Pat. No. 6,249,630.

One of the main problems with the CPA approach is that, in order to amplify pulses without significant nonlinear distortion, the pulse must be stretched to a duration of typically greater than 10 ns. Therefore, to compress the stretched amplified pulse, a fairly long and complex compressor is required. Furthermore, in stretching and compressing the pulse, bulk optic components are typically required, preventing an all-fiber approach. This is difficult to make robust and involves significant loss which necessitates another stage of amplification in the MOPA. Furthermore, after amplification and fiber delivery, the compression stage also involves significant optical loss and, due to the relatively long pulse duration, the compressor itself is very large, meaning that the optical head itself has a large footprint. In general, the approach of CPA is not ideal and is also difficult to maintain in a compact, robust and lightweight form especially in a harsh operating environment.

SUMMARY

According to an aspect of the present invention there is provided a high power short optical pulse source comprising:

an optical signal source operable to output short optical pulses;

an optical pump light source provided at a first location;

an optical head provided at a second location remote from the first location;

high power optical fiber amplifier means having at least its optical output located within the optical head;

an optical signal delivery fiber arranged to deliver optical pulses from the optical signal source to the high power optical fiber amplifier means; and a pump light delivery fiber arranged to deliver optical pump light to the high power optical fiber amplifier means, wherein short optical pulses of a first optical power are delivered to the high power optical fiber amplifier means and are amplified therein to a second, high optical power for output from the optical head.

The optical signal source preferably comprises a master oscillator optically coupled to an optical fiber preamplifier, comprising a preamplifier amplifier optical fiber and one or more preamplifier optical pump sources. The preamplifier amplifier optical fiber preferably comprises a rare-earth doped optical fiber. The optical signal source is preferably provided at the first location. Alternatively, the master oscillator and the preamplifier amplifier optical fiber may be provided at a third location, intermediate the first and second locations, with the or each preamplifier optical pump source being provided at the first location and being coupled to the preamplifier amplifier optical fiber via a corresponding one or more preamplifier pump delivery fibers.

A plurality of optical pump light sources may be provided at the first location and a corresponding plurality of pump light delivery fibers.

The high power optical fiber amplifier means preferably comprises an amplifier optical fiber and one or more pump signal combiners. The amplifier optical fiber preferably comprises a rare-earth doped optical fiber, and is most preferably of the same type of rare-earth doped optical fiber as the preamplifier amplifier optical fiber.

The high power short optical pulse source may comprise a plurality of high power optical fiber amplifier means optically coupled in series, at least the optical output of the final high power optical fiber amplifier means being located within the optical head.

The or each amplifier optical fiber is preferably located within the optical head. The or each pump signal combiner may be located within the optical head. The or each pump signal combiner may alternatively be located at the first location, with the high power optical fiber amplifier means additionally comprising a pump signal delivery fiber optically coupled between the or each pump signal combiner and the or each amplifier optical fiber. The or each pump signal delivery fiber is preferably a double-clad optical fiber and is most preferably a polarisation maintaining optical fiber.

Alternatively, the amplifier optical fiber may be arranged to extend from the first location to the optical head. The amplifier optical fiber preferably comprises a double-clad amplifier optical fiber. The or a pump signal combiner may be provided at the first location, arranged to couple optical pulses and pump light into one end of the amplifier optical fiber. Alternatively or additionally, the or a pump signal combiner may be provided within the optical head, arranged to couple pump light into the signal output end of the amplifier optical fiber.

The optical head preferably further comprises an optical isolator and optical collimator assembly optically coupled to the output of the high power optical fiber amplifier means.

The high power optical fiber amplifier means may further comprise a bulk optic amplifier element, most preferably a rod amplifier, optically coupled to the output end of the or the final amplifier optical fiber, said amplifier optical fiber being under-length such that a proportion of any pump light coupled into said amplifier optical fiber is unabsorbed by it, and serves to pump the bulk optic amplifier element.

The high power short optical pulse source may further comprise nonlinear optical frequency conversion means optically coupled to the output of the or the final high power optical fiber amplifier means. The nonlinear optical frequency conversion means preferably comprises a nonlinear optical crystal. The nonlinear optical frequency conversion means may comprise a plurality of nonlinear optical crystals arranged optically in series. The nonlinear optical frequency conversion means may alternatively comprise a nonlinear optical fiber.

The high power short optical pulse source may alternatively or additionally comprise an optical pulse compressor optically coupled to the output of the or the final high power optical fiber amplifier means or the nonlinear optical frequency conversion means. The optical pulse compressor may comprise a transmission grating pair or photonic crystal fiber having anomalous dispersion at the signal wavelength.

The high power short optical pulse source may further comprise a pulse picker operable to reduce the optical pulse frequency. The pulse picker preferably comprises an optical gate, such as an acousto-optic modulator, driven at a synchronised gating frequency lower than the optical pulse frequency output from the optical signal source.

The high power short optical pulse source may further comprise optical monitoring means within the optical head.

The optical head may be movably mounted to enable accurate direction of generated high power short optical pulses onto a target or specimen under test. The optical head is preferably mounted on a translation stage or a mechanical manipulator, such as a robotic arm.

BRIEF DESCRIPTION OF DRAWINGS

Embodiments of the invention will now be described in detail, by way of example only, with reference to the accompanying drawings, in which.

DETAILED DESCRIPTION

First Embodiment

Figure 1:
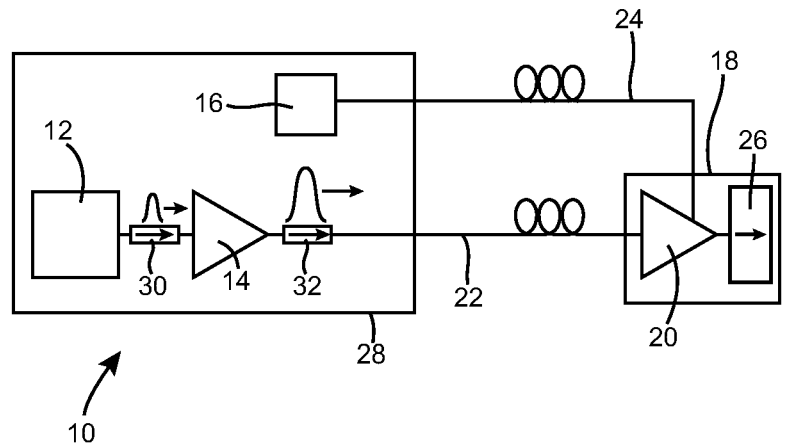
FIG. 1 is a schematic representation of a high power short optical pulse source according to a first embodiment of the invention.

Referring to FIG. 1, a first embodiment of the invention provides a high power short optical pulse source 10 comprising an optical signal source in the form of a master oscillator 12 and an Ytterbium doped fiber amplifier (YDFA) preamplifier 14, a pump light source 16, an optical head 18, high power optical fiber amplifier means 20, an optical signal delivery fiber 22, a pump light delivery fiber 24, and a high power optical isolator 26.

The master oscillator 12 comprises a modelocked fiber oscillator operable to output 10 ps pulses at a pulse frequency of 200 MHz. The preamplifier 14 amplifies the pulse average power to approximately 100 mW.

In this example, the master oscillator 12, preamplifier 14, and pump laser 16, together with their associated drive and control electronics, and cooling systems (not shown), are provided within a first enclosure 28 at a first location. Additional optical isolators 30, 32 are provided after the master oscillator 12 and the preamplifier 14 to protect them from back reflections.

The high power fiber amplifier means 20 comprises a 1 m long single-mode, polarisation maintaining, large mode area Ytterbium doped amplifier fiber and a pump signal combiner having a large mode area signal fiber. The high power fiber amplifier means 20 and the high power optical isolator 26 are provided within the optical head 18, which is located at a second location, remote from the first location.

The short, relatively low power optical pulses output from the preamplifier 14 are delivered to the pump signal combiner of the high power fiber amplifier means 20 via the optical signal delivery fiber 22, which comprises a 5 m long polarisation maintaining, single-mode optical fiber; the use of polarisation maintaining fiber prevents any environmental effects disturbing the signal.

The pump light source 16 comprises a fiber pig-tailed multi-emitter pump source operable to generate cw pump light at a wavelength of 915 nm, and an optical power of between 20 W and 40 W.

The pump light is delivered to the pump signal combiner of the high power optical fiber amplifier means 20 through the pump delivery fiber 24, which in this example is a 5 m length of optical fiber having a 105 μm diameter core and a numerical aperture of 0.22. The pump delivery fiber 24 is not sensitive to environmental effects but can, along with signal delivery fiber, be protected within an armoured jacket for industrial applications.

The high power optical fiber amplifier means 20 amplifies the received optical pulses to an average power of approximately 20 W, resulting in a pulse peak power of approximately 10 kW. The overall low nonlinearity of the high power optical pulse source 10 ensures that spectral broadening of the optical pulses is minimised, and the pulses have a final spectral bandwidth of less than 0.5 nm.

The optical head 18, containing the high power optical fiber amplifier means 20 and the isolator 26, has a small footprint and can be positioned at the intended target of the optical pulses. The large, noisy elements of the high power short optical pulse source 10 are thereby provided away from the application site of the pulses, and only the smaller optical head need be located near the intended target.

Second Embodiment

Figure 2:
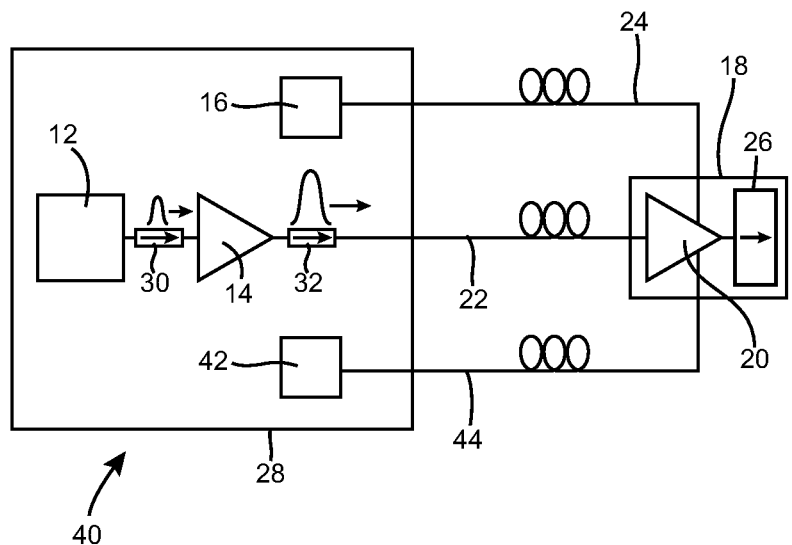
FIG. 2 is a schematic representation of a high power short optical pulse source according to a second embodiment of the invention.

FIG. 2 shows a high power short optical pulse source 40 according to a second embodiment of the invention. The optical pulse source 40 of this embodiment is substantially the same as the optical pulse source 10 of the first embodiment, with the following modifications. The same reference numbers are retained for corresponding features.

In this embodiment, a second pump light source 42 is provided at the first location, within the first enclosure. A second pump light delivery fiber 44 is also provided and delivers pump light from the second pump light source 42 to the pump signal combiner of the high power optical fiber amplifier means 20.

It will be appreciated that the high power optical fiber amplifier means 20 may alternatively comprise a two-stage amplifier having a series of two amplifier fibers and pump signal combiners, with an isolator provided between amplifier stages as necessary. Each pump signal source 16, 42 would then pump a separate amplifier stage, the amplifier stages being cascaded to provide increasing signal with balanced gain throughout the cascade.

In most applications, the high power optical fiber amplifier means 20 will only require a single amplifier fiber. However, the number of amplifier fibers (and thus the number of pump light sources) will at least in part be determined by the power of the optical pulses output from the preamplifier 14, the length of signal delivery fiber 22, and the permitted amount of nonlinear effects as determined by the application of the high power short optical pulse source 10.

Third Embodiment

Figure 3:
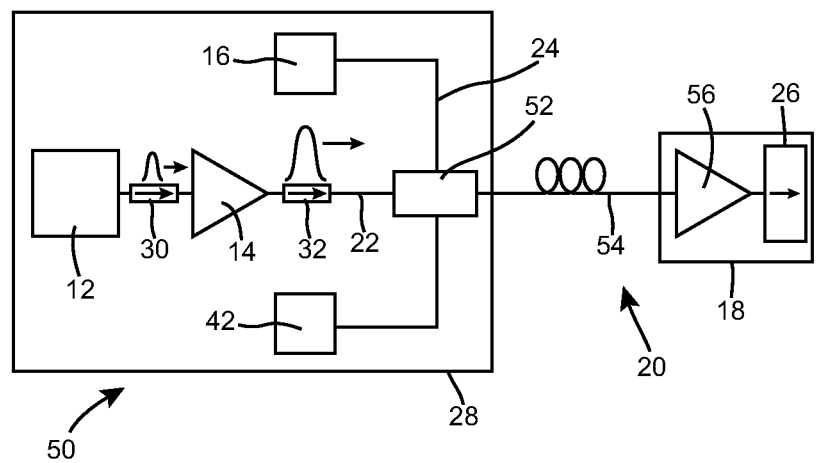
FIG. 3 is a schematic representation of a high power short optical pulse source according to a third embodiment of the invention.

A high power short optical pulse source 50 according to a third embodiment of the invention is shown in FIG. 3. The pulse source 50 according to this embodiment is substantially the same as the pulse source 40 of the previous embodiment, with the following modifications. The same reference numbers are retained for corresponding features.

In this embodiment, the pump signal combiner 52 of the high power optical fiber amplifier means 20 is provided at the first location, within the first enclosure 28. The pump delivery fibers 24, 44 and the signal delivery fiber 22 are also wholly contained within the first enclosure 28.

The high power optical fiber amplifier means 20 of this embodiment further comprises a pump signal delivery fiber 54, which comprises the output fiber of the pump signal combiner 52. The pump signal delivery fiber 54 is a polarisation maintaining double clad optical fiber which has a signal-guiding core region and an inner cladding which guides the pump light from the pump sources 16, 42.

The pump signal delivery fiber 54 extends from the pump signal combiner 52, within the first enclosure 28, to the amplifier fiber 56, within the optical head 18. The amplifier fiber 56 is therefore pumped in the co-propagating regime.

Fourth Embodiment

Figure 4:
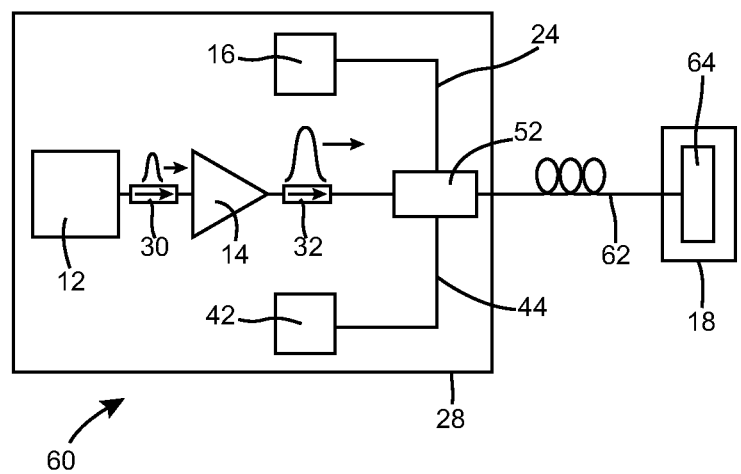
FIG. 4 is a schematic representation of a high power short optical pulse source according to a fourth embodiment of the invention.

FIG. 4 shows a high power short optical pulse source 60 according to a fourth embodiment of the invention. The pulse source 60 of this embodiment is substantially the same as the pulse source 50 of the previous embodiment, with the following modifications.

In this embodiment, the amplifier fiber 62 comprises a polarisation maintaining double clad amplifier fiber and extends between the pump signal combiner 52 and the optical head 18. The input end of the amplifier fiber 62 is coupled to the output of the pump signal combiner 52 and the output end of the amplifier fiber 62 is located in the optical head 18, where it is coupled to an optical isolator and collimating optics 64. The amplifier fiber 62 therefore provides the dual functions of pulse amplification and pulse delivery to the optical head 18.

Since fiber amplifiers are not 100% efficient (typically 50 to 75% efficiency is achievable), the amplifier fiber 62 will get warm during use. Heat dissipation may be achieved by using an armoured cable to protect the amplifier fiber 62; the void around the amplifier fiber 62 being filled with a suitable heat transfer fluid or paste to ensure good thermal contact between the amplifier fiber 62 and the cable inner surface.

Fifth Embodiment

Figure 5:
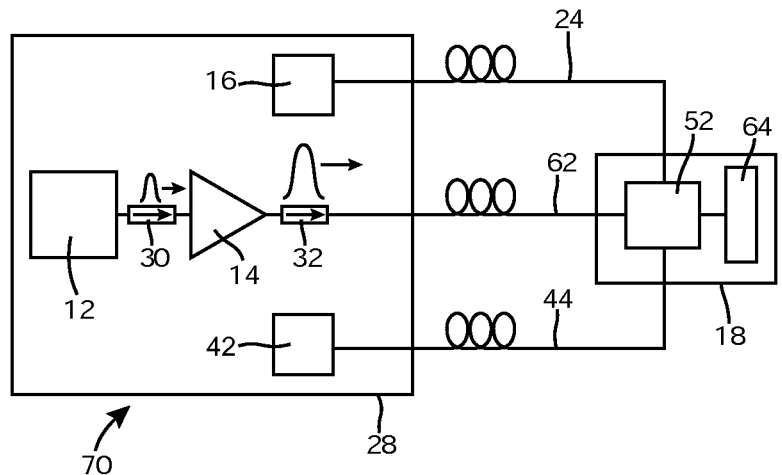
FIG. 5 is a schematic representation of a high power short optical pulse source according to a fifth embodiment of the invention.

A high power short optical pulse source 70 according to a fifth embodiment of the invention is shown in FIG. 5. The pulse source 70 of this embodiment is substantially the same as the pulse source 60 of the previous embodiment, with the following modifications.

In this example, the pump signal combiner 52 is provided in the optical head 18, so that a counter-propagating pump regime is used. The pump delivery fibers 24, 44 extend from the pump sources 16, 42 in the first enclosure to the pump signal combiner 52 in the optical head 18.

Sixth Embodiment

Figure 6:
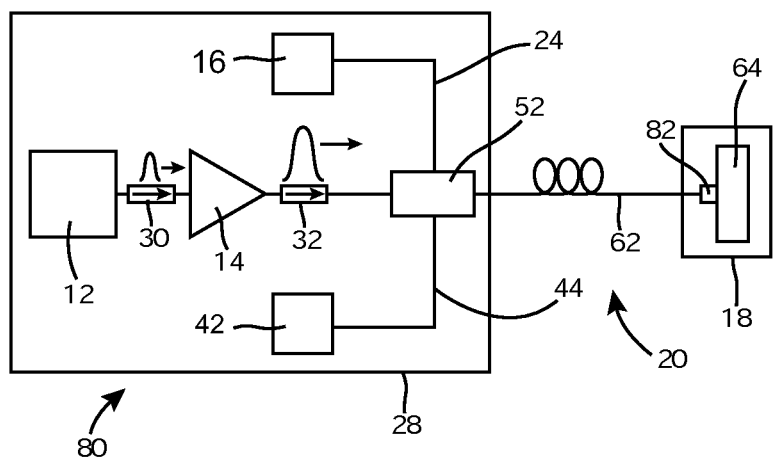
FIG. 6 is a schematic representation of a high power short optical pulse source according to a sixth embodiment of the invention.

A high power short optical pulse source 80 according to a sixth embodiment of the invention is shown in FIG. 6. The optical pulse source 80 is substantially the same as the pulse source 60 of FIG. 4, with the following modifications.

In this example, the amplifier fiber 62 is made to be "under-length", such that quite a large portion of the pump light delivered to the amplifier fiber is not absorbed within the amplifier fiber, but propagates through to the fiber output, along with the signal pulses. The high power optical fiber amplifier means 20 further comprises a rod amplifier 82, in the form of a Yttrium Aluminium Garnet (YAG) crystal rod, optically coupled to the output of the amplifier fiber 62, to form a hybrid amplifier device. The YAG crystal rod 82 performs a second stage of amplification of the short optical pulses, in a very short piece of material, using the unabsorbed pump light to pump the YAG crystal rod 82. The YAG crystal rod 82 can provide an additional gain of a few dB's while providing very little nonlinear distortion to the signal pulses. The gain of the YAG crystal rod 82 is determined by the efficiency of the crystal, the divergence of pump light and the signal pulses, and the overlap of the pump light and the signal pulses through the YAG crystal rod 82.

In order to prevent optical feedback from the YAG crystal 82 into the amplifier fiber 62, both the output end of the amplifier fiber 62 and the YAG crystal rod 82 are coated with anti-reflection coatings. Alternatively, the amplifier fiber 62 and the YAG crystal rod can be fused together.

It will be appreciated that a rod amplifier such as the YAG crystal rod 82 may also be used with any of the embodiments described above.

Seventh Embodiment

Figure 7:
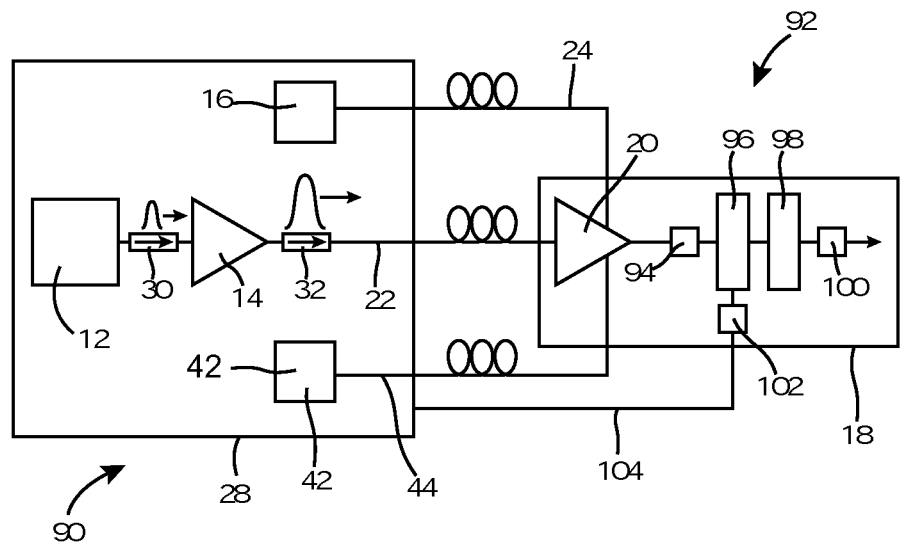
FIG. 7 is a schematic representation of a high power short optical pulse source according to a seventh embodiment of the invention.

FIG. 7 shows a high power short optical pulse source 90 according to a seventh embodiment of the invention. The optical pulse source 90 is based on the optical pulse source 40 of FIG. 2, with the following modifications. The same reference numbers are retained for corresponding features.

In this example the high power short optical pulse source 90 further comprises nonlinear optical frequency conversion means 92, optically coupled to the output of the high power optical fiber amplifier means 20 and located within the optical head 18.

The nonlinear optical frequency conversion means 92 comprises (optically coupled in series) a set of phase plates 94, a first nonlinear crystal 96, which in this example is a Type I LBO crystal, a second nonlinear crystal 98, which in this example is a Type I BBO crystal, and a harmonic separator 100.

The output optical pulses from the high power optical fiber amplifier means 20, having a wavelength of 1064 nm and an average power of approximately 20 W, pass through the phase plates 94, to set the optimum state of polarisation for the nonlinear frequency conversion. The pulses are then launched, using conventional collimation and focusing optics, into the LBO crystal 96, to convert the wavelength of the pulses to their second harmonic of 532 nm, at an average power of 12 W.

The frequency converted pulses output from the LBO crystal 96 are then launched into the BBO crystal 98, where the wavelength is converted to their fourth harmonic wavelength of 266 nm, at an average power of 1.2 W. The output from the BBO crystal 98 is then passed through the harmonic separator 100, which transmits only the desired wavelength, in this case 266 nm, as the output of the high power short optical pulse source 90 to the intended target.

The LBO and BBO crystals 96, 98 are respectively mounted within ovens, controlled by a temperature controller 102. Electrical power for the ovens and the temperature controller 102, and to a cooling fan (not shown) for the high power optical fiber amplifier means 20 is delivered to the optical head 18 through a power cable 104.

It will be appreciated that the nonlinear optical frequency conversion means 92 could alternatively use other combinations of crystals to generate $3^{rd}$, $4^{th}$ or higher harmonics, for example periodically poled nonlinear crystals such as periodically poled lithium niobate (PPLN) or periodically poled potassium titanyl phosphate (PPKTP), or could use other combinations of conventional crystals such as LBO, BBO, $BiB_3O_6$ (BIBO), cesium lithium borate (CLBO), and potassium titanyl phosphate (KTP).

For efficient frequency conversion the spectral bandwidth of the pulses must be maintained as narrow as possible. By transmitting the optical pulses through the greatest length of fiber before amplifying the pulses close to the nonlinear optical conversion means 92, the high power short optical pulse source 90 ensures that spectral distortion of the pulses is minimised and nonlinear optical conversion efficiency is thereby maximised.

The high power short optical pulse source 90 can therefore deliver UV light directly to an intended target whilst remotely positioning the bulky elements of the source 90 away from the intended target.

It will be appreciated that the nonlinear optical frequency conversion means 92 may be is included in any of the high power short optical pulse sources according to the previously described embodiments.

Eighth Embodiment

Figure 8:
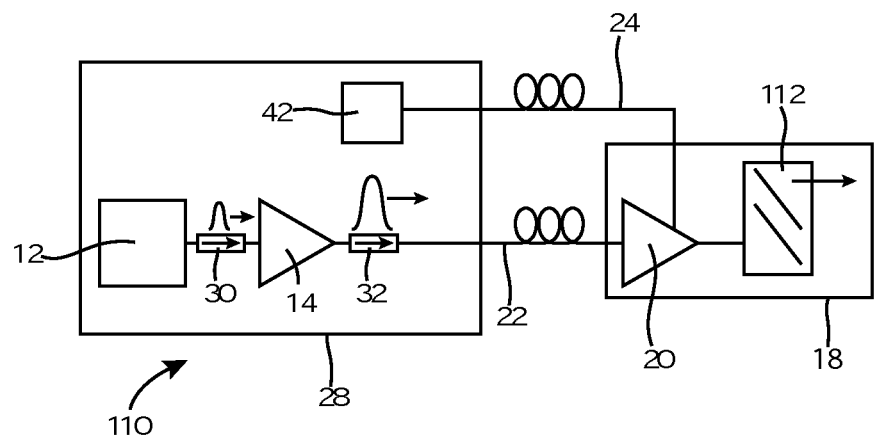
FIG. 8 is a schematic representation of a high power short optical pulse source according to a eighth embodiment of the invention.

A high power short optical pulse source 110 according to an eighth embodiment of the invention is shown in FIG. 8. The pulse source 110 of this embodiment is based on the pulse source 10 of the first embodiment, with the following modifications, and is operable to generate ultrashort (femtosecond) optical pulses. The same reference numbers are retained for corresponding features.

The optical pulse source 110 further comprises a pulse compressor 112 provided within the optical head 18 and optically coupled to the output of the high power optical fiber amplifier means 20.

In this example the pulse compressor takes the form of a transmission grating pair 112 having a grating separation of less than 10 cm. The pulse compressor 112 could alternatively comprise a fiber pulse compressor based on Photonic Crystal Fiber with anomalous dispersion at the signal wavelength.

The master oscillator 12 generates optical pulses having a duration of approximately 10 ps at a pulse frequency of 10 MHz. The pulses are then amplified by the optical fiber preamplifier 14 to an optical power of approximately 50 mW. The signal pulses and 20 W 975 nm pump light from the pump light source 16 single are delivered over the signal delivery fiber 22 and the pump delivery fiber 24 respectively, each of which are 2 m long in this example, to large mode area, polarisation maintaining, single-mode Ytterbium doped amplifier fiber within the high power optical fiber amplifier means 20. The high power optical fiber amplifier means 20 amplifies the average pulse power to approximately 12 W, resulting in a pulse energy of greater than 1 µJ.

During amplification within the high power optical fiber amplifier means, the pulses (which enter the high power optical fiber amplifier means with a duration of approximately 10 ps) becomes linearly chirped due to the combination of positive fiber dispersion and self-phase modulation.

The amplified pulses are then passed through the transmission grating pair 112, which acts to compress the pulses to less than 500 femtoseconds duration, with an efficiency of greater than 80%, to produce pulses having an energy of approximately 10 and peak powers of 2 MW. The high power ultrashort pulses can then be delivered from the head 18 which can be positioned directly at the intended target without the need for complex beam steering optics.

It will be appreciated that a pulse compressor 112 may be incorporated into any of the above described high power short optical pulse sources in order to generate ultrashort, femtosecond pulses.

Ninth Embodiment

Figure 9:
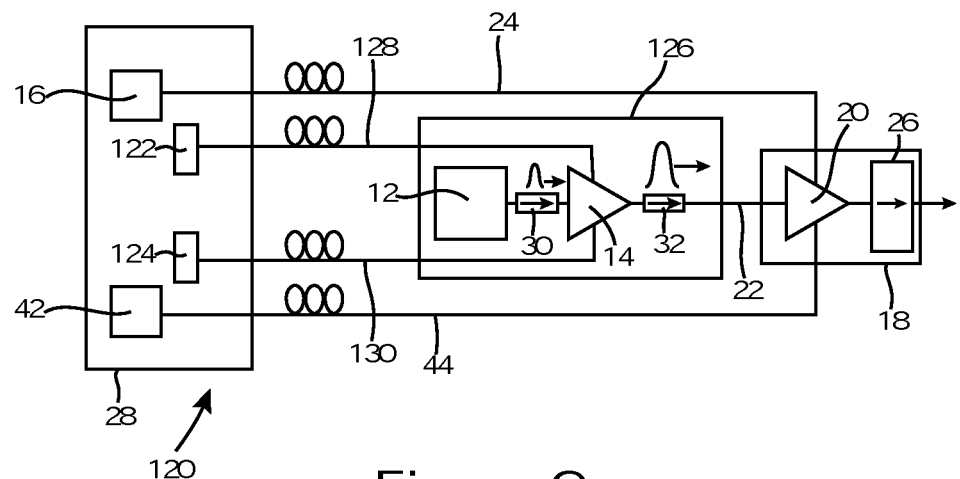
FIG. 9 is a schematic representation of a high power short optical pulse source according to a ninth embodiment of the invention.

FIG. 9 shows a high power short optical pulse source 120 according to a ninth embodiment of the invention. The pulse source 120 is substantially the same as the pulse source 40 of FIG. 2, with the following modifications. The same reference numbers are retained for corresponding features.

In this embodiment the pump light sources 16, 42 are provided within the first enclosure 28, at the first location, together with the pump sources 122, 124 for the preamplifier 14, and their associated electrical drive circuitry, cooling and heat dissipation elements (not shown). The high power optical fiber amplifier means 20 and the optical isolator 26 are provided within the optical head 18, at a second location, remote from the first location.

The master oscillator 12 and the amplifier fiber and pump signal combiner of the optical fiber preamplifier 14, together with their associated isolators 30, 32, are provided within a second enclosure 126, at a third location intermediate the first and second locations, 126. The outputs of the preamplifier pump sources 122, 124 are delivered to the amplifier fiber of the optical fiber preamplifier 14 respectively via preamplifier pump delivery fibers 128, 130

The master oscillator 12, preamplifier 14, and high power optical fiber amplifier means 20 can thus be enclosed in one or more separate enclosures positioned close to the application target area thus avoiding the need for beam steering optics.

It will be appreciated that this arrangement can also be applied to any of the previously described embodiments, including those with nonlinear frequency conversion and pulse compression.

Tenth Embodiment

Figure 10:
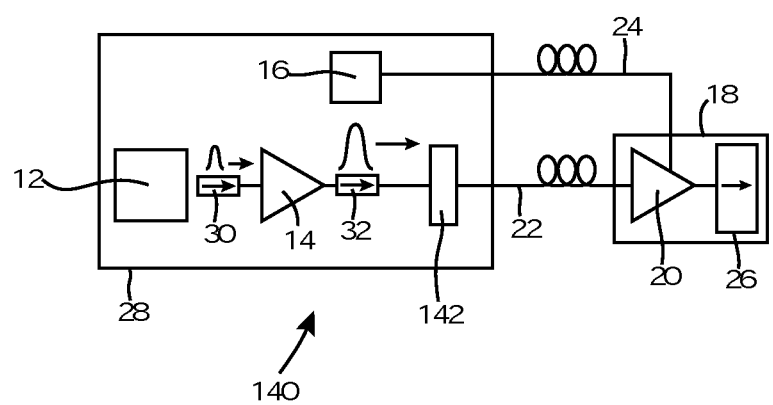
FIG. 10 is a schematic representation of a high power short optical pulse source according to a tenth embodiment of the invention.

FIG. 10 shows a high power short optical pulse source 140 according to a tenth embodiment of the invention. The pulse source 140 is substantially the same as the pulse source 10 of FIG. 1, with the following modifications. The same reference numbers are retained for corresponding features.

The pulse source 140 further comprises a pulse picker 142 operable to reduce the optical pulse frequency. In this example the pulse picker 142 comprises an acousto-optic modulator driven at a synchronised gating frequency lower than the optical pulse frequency output from the master oscillator 12. The pulse picker 142 is provided after the preamplifier 14, within the first enclosure 28. The pulse picker 142 is located at a position within the pulse source 140 where the optical pulses have a low pulse energy. This is because the optical insertion loss into the acousto-optical modulator pulse picker 142 is high, so it is preferable for the pulses to be transmitted through the pulse picker 142 prior to amplifying them to their final high power. The provision of a pulse picker also enables higher pulse energies to be achieved for a given average output power.

It will be appreciated that a pulse picker 142 may be provided within any of the above described pulse sources, and that where the pulse source comprises high power optical fiber amplifier means having two or more amplifier stages the pulse picker may be provided after any one of the amplifier stages between the master oscillator the final high power amplifier stage.

Eleventh Embodiment

Figure 11:
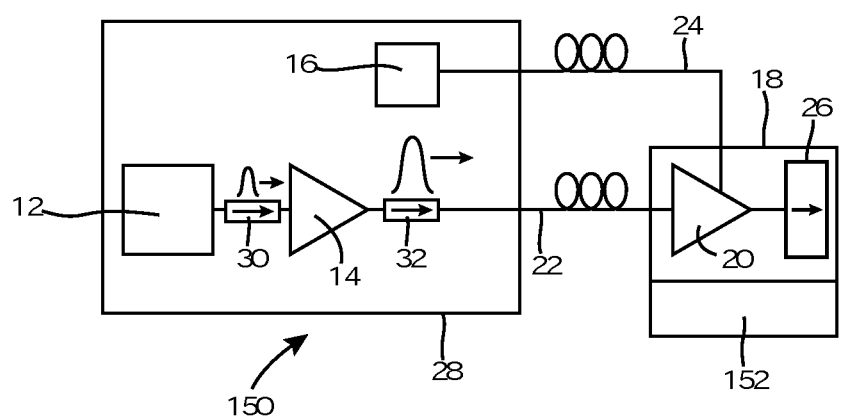
FIG. 11 is a schematic representation of a high power short optical pulse source according to an eleventh embodiment of the invention.

A high power short optical pulse source 50 according to an eleventh embodiment of the invention is shown in FIG. 11. In this example, the optical head 18 is movably mounted on a translation stage 152 which is operable to provide translation of the optical head 18 in one or more of the x-, y- and z-axes. The controlled movement of the optical head 18 provided by the translation stage 152 enables accurate direction of the output high power short optical pulses onto a target or specimen under test. The optical head 18 may alternatively be mounted on a mechanical manipulator such as a robotic arm.

It will be appreciated that the optical heads 18 of any of the previously described embodiments may be similarly movably mounted.

Various modifications may be made to the described embodiments without departing from the scope of the invention.

It will be appreciated that the master oscillator could alternatively comprise any optical source operable to generate short optical pulses, such as a solid-state modelocked laser, for example a Neodynium Vanadate laser, or a gain-switched laser diode. The amplifier fibers of the preamplifier and the high power optical fiber amplifier means may alternatively be doped with a different rare-earth dopant, such as Erbium, Thulium, or Neodynium.

In most applications, the pump source's will be a multi-mode pump source operating at a suitable wavelength to pump the rare-earth-doped amplifier fiber (e.g. 808 nm, 915 nm or 975 nm). For example, a single fiber-pigtailed laser diode, diode bar or multi-emitter pump source such as the PUMA source commercially supplied by Fianium Ltd, which delivers between 20 and 40 W within a single, 105 μm core, 0.22 NA pump delivery fiber.

Where multi-mode pump delivery fibers are used, the pump signal combiner will typically include a conventional tapered bundle, such as those commercially available from OFS or Sifam Fiber Optics. Alternatively, the pump signal combiner may be a tapered coupler, a side-pumping fiber configuration, or a distributed pump coupling fiber configuration such as that proposed in U.S. Pat. No. 6,826,335. In the multi-mode pumping regime, the amplifier fiber typically comprises a double-clad fiber structure where the signal pulses are guided within a signal core and the pump light is guided within the fiber cladding.

Alternatively, the pump source/s can be a single mode pump source such as a fiber-pigtailed laser diode or a fiber laser. The fiber laser can be a Raman fiber laser or could be a cladding pumped fiber laser generating cw or pulsed radiation at the wavelength required to pump the rare-earth-doped amplifier fiber. In the single-mode pump regime, the signal pulses and pump light from the one or more pump sources are combined using conventional wavelength-division multiplexing (WDM) components such as fused WDM couplers or thin-film WDM couplers.

In the single-mode pump regime, the amplifier fiber has a conventional single clad geometry, where both the signal pulses and the pump light propagate within the core of the amplifier fiber. This has benefits in increasing the pump absorption and thus reducing amplifier length and hence non-linearity.

The optical head of any of the high power short optical pulse sources described may also include a heat sink and integrated fan within the high power optical fiber amplifier means, to provide forced-air cooling of the amplifier fiber. Optical monitoring means may also be provided within the optical head, with both electrical and optical communication to the first enclosure to monitor feedback and power levels, enabling interlocks and automatic fault detection.

The described embodiments provide various advantages, as follows.

The high power short optical pulse sources enable a short-length fiber amplifier system and post processing optics to be remotely located from the bulky, noisy heat producing elements of the pulse source, and thereby enable optical head to be very compact. The optical head can therefore be positioned close to the application space, taking up minimal space and avoiding the need for complex and expensive beam steering optics.

The high power short optical pulse sources enable the delivery of ultrashort (femtosecond) optical pulses with high energy and narrow spectral bandwidth, without the use of complex chirped pulse amplification (CPA) methods. In short optical pulse amplifier systems which don't incorporate CPA methods, it is essential that all fiber lengths which deliver or amplify pulses to high peak powers, are kept as short as physically possible; the structure and configuration of the high power short optical pulse sources ensures that this is achieved.

The high power short optical pulse sources incorporating a pulse compressor eliminate the need for CPA in fiber-delivered laser sources. Providing a high power ultrashort pulse source which is more robust, lower cost and easier to maintain and assemble than known ultrashort pulse sources using CPA pulse compression.

The high power short optical pulse sources further enable the delivery of UV optical pulses, efficiently generated within the optical head.

The high power short optical pulse sources also provide the advantage of beam delivery directly to the target without the use of complex beam steering optics. The high power short optical pulse sources therefore offer improved mechanical robustness, reduced cost and weight, and ease of maintenance over known high power optical pulse sources.

The high power short optical pulse sources also allow for scalability in power because they can incorporate multiple pump light sources in the remote pump enclosure and the pump delivered over long lengths with very low loss to the amplifier system which is remotely located whether within or close to the output optical head.

The invention claimed is:

1. Optical pulse source for providing optical output pulses, comprising:
   a master oscillator comprising a mode locked fibre oscillator producing optical pulses having an optical pulse frequency;
   at least one optical fibre amplifier optically coupled to the master oscillator, the at least one optical amplifier including a final optical fibre amplifier;
   a bulk optic amplifier element optically coupled to the output of the final optical fibre amplifier;
   a nonlinear optical fibre for nonlinearly producing light, the nonlinear optical fibre optically coupled to the output of the bulk optic amplifier element;
   an optical pulse compressor optically coupled to the output of the nonlinear optical fibre; and a pulse picker operable to reduce the optical pulse frequency of the optical output pulses to be less than the optical pulse frequency of the optical pulses produced by the master oscillator.

2. The optical pulse source of claim 1 wherein said bulk optic amplifier element comprises a rod amplifier.

3. The optical pulse source of claim 2 wherein said final optical fibre amplifier includes an amplifier fibre that is fused to said rod amplifier.

4. The optical pulse source of claim 2 wherein said final optical fibre amplifier comprises an ytterbium doped amplifier fibre.

5. The optical pulse source of claim 1 wherein said final optical fibre amplifier comprises an ytterbium doped amplifier fibre.

6. The optical pulse source of claim 1 wherein said at least one optical fibre amplifier includes another optical fibre amplifier in addition to said final optical fibre amplifier.

7. The optical pulse source of claim 6 wherein said optical pulse picker is located between said another optical fibre amplifier and said final optical fibre amplifier.

8. The optical pulse source of claim 6 wherein said final optical fibre amplifier comprises an ytterbium doped amplifier fibre.

9. The optical pulse source of claim 7 wherein said final optical fibre amplifier comprises an ytterbium doped amplifier fibre.

10. The optical pulse source of claim 9 wherein said ytterbium doped amplifier fibre comprises a single mode fibre.

11. The optical pulse source of claim 7 wherein said final optical fibre amplifier comprises a single mode amplifier fibre.

12. The optical pulse source of claim 1 wherein said optical pulse picker is located between said master oscillator and the final amplifier stage, said bulk optic amplifier element being the final amplifier stage of said optical pulse source.

13. The optical pulse source of claim 1 wherein the optical output pulses have a time duration of less than 10 ns.

14. The optical pulse source of claim 1 wherein said final optical fibre amplifier comprises a single mode amplifier fibre.

* * * * *